Dec. 20, 1955 A. MISELLI 2,727,434
IMAGE REFLECTIVE STEREOSCOPIC POCKET APPARATUS
Filed Dec. 22, 1953

INVENTOR
AFRO MISELLI
BY
By Young, Emery & Thompson
ATTORNEYS

United States Patent Office 2,727,434

Patented Dec. 20, 1955

2,727,434

IMAGE REFLECTIVE STEREOSCOPIC POCKET APPARATUS

Afro Miselli, Milan, Italy

Application December 22, 1953, Serial No. 399,699

Claims priority, application Italy December 23, 1952

4 Claims. (Cl. 88—31)

Stereoscopic apparatuses are known intended for viewing series of images mounted upon a disc caused to rotate around its own axis by hand, so as to bring at each angular displacement two stereoscopic images before the oculars, in order to ensure a stereoscopic vision of the image to an observer looking through the oculars. These known apparatuses are generally cumbersome and can be used on a table, but are not convenient to be carried on a journey or in one's pocket.

The present invention has as an object a pocket stereoscopic apparatus, whose thickness is considerably reduced, so as to make it suitable to be carried in a pocket or a bag and especially handy for travellers, sportsmen and the like.

The pocket stereoscopic apparatus according to the invention is formed by a flat box, two oculars having their axes almost parallel to the bottom of the said box, two mirrors mounted respectively at 45° in respect to the axes of the oculars, and a cover provided with two apertures aligned with the rays coming from the mirrors, a clearance being provided between the cover and the box, over at least half a circumference, for inserting a disc carrying the couples of stereoscopic figures to be viewed by transparence.

The annexed drawing represents schematically and by way of example a preferred embodiment of the present invention, and specifically, Fig. 1 is a view of the apparatus as seen from the cover side.

Figures 1, 2, 3, 4, 5:
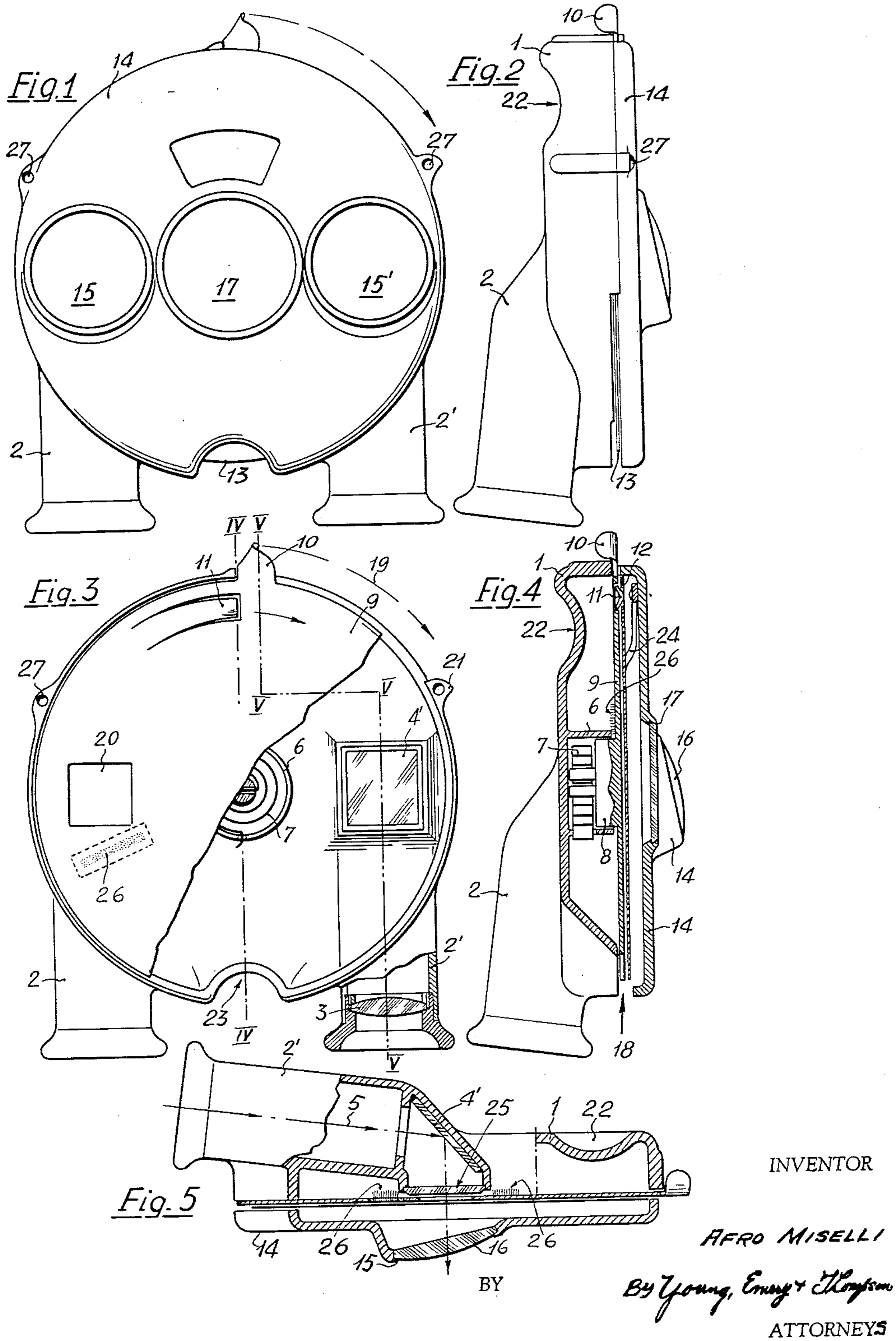
Fig. 2 is a side view.
Fig. 3 is a part section of the inner portion of the box after having taken the cover and a part of an internal diaphragm off.
Fig. 4 is a longitudinal section according to line IV—IV of Fig. 3 without removed parts.
Fig. 5 is a longitudinal section according to line V—V of Fig. 3 without removed parts.

As the drawing shows, the pocket stereoscopic apparatus comprises a flat box 1 provided with two oculars 2—2' having their axes almost parallel to the bottom of the box, whereas the apparatus used until now had the axes of the oculars perpendicular to the box. Said oculars carry at their outer extremity a magnifying lens 3 and at their inner extremity a mirror 4' inclined at 45° to the ocular axis, so that ray 5 is converted to a reflected ray which is practically perpendicular to the box and consequently to the disc carrying the stereoscopic figures to be observed. On the bottom of box 1 a projecting border 6 is provided, forming a central cavity on whose bottom spring 7 is arranged, one end of which is connected to border 6, whereas the other end is fixed to the center pivot of an operating disc 9 provided with a grip 10 projecting outwards, and provided with a small tooth 11 apt to insert itself into apertures 12 provided in disc 13 which carries the stereoscopic images. Disc 12 is inserted in a semi-circular seat 18 prepared between the border of box 1 and the border of cover 14. The latter is provided with two apertures

15 and 15', preferably covered by a convex ground glass 16, and with a central aperture 17 through which it is possible to see the titles usually inscribed on the central portion of the disc carrying the couples of stereoscopic images. The operating disc 9 has two apertures 20 which when the disc is at rest dispose themselves in front of mirrors 4' so as to be aligned with the apertures 15 of cover 14, provided with a protecting glass 25. In order that the said glasses may not get dirty when introducing the discs provided with the couples of stereoscopic figures thus clouding vision, operating disc 9 carries two radial brushes 26 made with very fine bristles or cloth, chamois skin or the like to clean glasses 25 at each angular displacement of the disc. This ensures at all times a clear vision. The cover 14 is fixed on the supporting box 1 by means of lugs and screws 27 and it contacts the border of the box 1 along half of its periphery, while it is separate from it by means of a clearance along the other half periphery, to leave an interspace for inserting the figure carrying disc to be stereoscopically viewed.

The apparatus is operated as follows:

A disc 13 is introduced into the semi-circular space 18 existing between box 1 and cover 14, turning the portion provided with the titles toward the cover. Said disc 13 is provided at its periphery with notches 12 into which the teeth 11 of operating disc 9 penetrate, so that said operating disc 9 and the image carrying disc will rotate together. Consequently by turning grip 10 in the direction of the arrow 19 until stop 21, an angular displacement of disc 13 will be effected so as to bring a pair of stereoscopic images before mirrors 4' and when the disc 9 completes its return travel, before the apertures 20. The observer that approaches his eyes to oculars 2—2' has therefore a stereoscopic vision of the image. As each one of the discs 13 carries several couples of diametral images, by operating each time disc 9 by means of grip 10 a new couple of stereoscopic images is successively carried before the mirrors.

In practice the axes of oculars 2—2' will be arranged with a slight inclination of a few degrees with respect to the plane of the box and consequently the glasses 16 of apertures 15 will be slightly inclined through the same angle and in the opposite direction. Thus a better visual angle will be had with a greater ease in using the apparatus without, however, having unduly projecting parts, and enabling the smallest possible encumberance to the apparatus.

To increase handiness, a depression 22 has been provided at the bottom of the box to better hold the apparatus, and another depression 23 has been arranged on the front border between the two oculars 2—2' both to make room for the nasal bone and to enable the disc to be readily extracted. One or more springs 24 attached to cover 14 press against disc 13 to keep it adherent to the operating disc 10 and ensure the hold between tooth 11 and apertures 12. Tooth 11 is shaped like a flat spring as it appears from Fig. 3, so that the disc 9 can easily return to its place without dragging disc 11 along during its return travel, whereas it drags it along again during the successive outwards travel, so that all of the couples of images are brought in succession before the observer's eyes.

What I claim is:

1. A pocket stereoscopic apparatus comprising a flat circular box, two oculars, two mirrors mounted respectively at 45° with respect to the axes of the oculars, a cover provided with two apertures aligned with the rays coming from the mirrors, said cover and box having a space therebetween for introducing a disc carrying pairs of stereoscopic figures to be viewed by transparence, the two oculars being provided with magnifying lenses and mounted almost parallel but with a slight inclination to the outer bottom of the supporting box, the mirrors being mounted at 45° with respect to the axis of each ocular at the point where the latter meet the bottom of the box, and a movable diaphragm with a grip on the outside having the same diameter as the box and having two diametral apertures adapted to be arranged in correspondence with the rays coming from the mirrors, said diaphragm being pivoted on the inner bottom of the box and integral with a spiral spring anchored to said box in order to accomplish a controlled angular displacement followed by an automatic return, said operating disc carrying a projection in the form of an inclined plane adapted to carry along in its angular displacement the disc carrying the transparent images and provided with a number of notches arranged in correspondence with said projection, the cover being fixed in the supporting box, by means of lugs and screws, contacting with the box along a semi-perimeter, while it is separate from it in the other semi-perimeter to provide said space for the introduction of said figure carrying disc to be stereoscopically viewed, the axes of the apertures in the cover being inclined by the same angle and in an opposite direction to the axes of the oculars and being protected from the exterior by convex ground glasses.

2. An apparatus according to claim 1, in which the cavity containing the mirror is closed towards the inside of the box, by a protecting glass and in which the operating disc, in correspondence with said glass carries a cleaning member that rubs with every angular displacement against the glass and cleans it.

3. An apparatus according to claim 1, in which on the surface of the cover carrying the apertures with convex ground glass, a central aperture is provided through which the titles on the figured discs are read and the supporting box has on its outer bottom, in the zone diametrically opposite to the oculars, a depression serving as a hand grip to the observer.

4. An apparatus according to claim 1, in which the oculars project a little from the border or profile of the supporting box and said border has a depression in correspondence with the centerline between the two oculars both to accommodate the observer's nose and to permit the extraction of a disc.

References Cited in the file of this patent

UNITED STATES PATENTS

| | | |
|---|---|---|
| 2,189,285 | Gruber | Feb. 6, 1940 |
| 2,511,334 | Gruber | June 13, 1950 |

FOREIGN PATENTS

| | | |
|---|---|---|
| 459,113 | Italy | Aug. 25, 1950 |